United States Patent [19]

Siegfried

[11] Patent Number: 4,646,565
[45] Date of Patent: Mar. 3, 1987

[54] ULTRASONIC SURFACE TEXTURE MEASUREMENT APPARATUS AND METHOD

[75] Inventor: Robert W. Siegfried, Frisco, Tex.

[73] Assignee: Atlantic Richfield Co., Los Angeles, Calif.

[21] Appl. No.: 815,298

[22] Filed: Dec. 27, 1985

Related U.S. Application Data

[63] Continuation of Ser. No. 751,832, Jul. 5, 1985, abandoned.

[51] Int. Cl.$^4$ .................. E21B 49/00; G01V 1/40
[52] U.S. Cl. .................................. 73/152; 181/105
[58] Field of Search ............... 73/151, 152, 603, 606, 73/618, 622, 628, 640, 641, 646; 181/105; 364/422; 367/28, 35; 33/302, 303

[56] References Cited

U.S. PATENT DOCUMENTS 3,021,706  2/1962  Cook et al. .................... 73/151

FOREIGN PATENT DOCUMENTS 1199336  7/1970  United Kingdom .............. 367/28
2133882  8/1984  United Kingdom .............. 181/105

OTHER PUBLICATIONS

Short, "Borehole TV Camera Gives Geologists Inside Story", Nov. 1962.
Pasternack, "Transactions of the SPWLA Twenty-Fourth Annual Logging Symposium", Jun. 1983, vol. 1, pp. 1 to 12.

Primary Examiner—Stewart J. Levy
Assistant Examiner—Robert R. Raevis
Attorney, Agent, or Firm—Robert M. Betz

[57] ABSTRACT

An ultrasonic borehole televiewer is modified to provide a vertical array of receiving transducers arranged above and below a conventional transmit/receive transducer. The variation in amplitude of reflected energy detected across this array for each firing of the televiewer is a measure of the extent to which scattered energy is present in addition to specular reflections. This in turn is an index of the relative smoothness or roughness of the borehole surface on a scale comparable to or smaller than the wavelength of the incident energy.

5 Claims, 6 Drawing Figures

ULTRASONIC SURFACE TEXTURE MEASUREMENT APPARATUS AND METHOD

This application is a continuation, of application Ser. No. 06/751,832, filed 7/5/85 now abandoned.

BACKGROUND OF THE INVENTION

1. Field of the Invention

This invention relates generally to the field of well logging and more particularly to a means and method for determining the texture or roughness of the surface of a borehole.

2. Prior Art

Ultrasonic logging tools such as a borehole televiewer provide detailed sensing of the reflectance and topographic properties of a borehole surface. However, in many applications, such as grain size determination or corrosion detection, information regarding the textural properties of the borehole surface on a scale finer than the resolution attainable with such a televiewer is desirable.

When an ultrasonic beam from such a televiewer impinges upon the surface of a borehole, some energy is specularly reflected according to the laws of gometric optics (i.e., in mirror-like manner) and some energy is scattered in all directions. The amount of such scattered energy as compared to that of the specular reflection is controlled by surface roughness or features on a scale comparable to or smaller than the wavelength of the incident ultrasonic energy.

It is therefore a general object of this invention to provide a means and method for making ultrasonic measurements of the energy scattering properties of the surface of a borehole in order to characterize its texture or roughness.

It is a more particular object of this invention to provide an improved means and method for determining the texture of a borehole surface with a high degree of resolution.

Other and further objects and advantages of this invention will become apparent from a consideration of the detailed description to follow taken in conjunction with the appended drawings.

SUMMARY OF THE INVENTION

In accordance with a preferred embodiment of this invention, a system is described utilizing a modified borehole televiewer adapted to cyclicly scan the surface of a borehole in order to obtain, analyze and display information indicative of borehole surface texture or roughness. The televiewer sonde comprises a rotatable transducer array consisting of a central transducer for transmission and reception of ultrasonic energy and a plurality of additional receiving transducers disposed vertically above and below the central transducer. For each firing of the televiewer at a selected depth an ultrasonic pulse is beamed toward a separate point on the circumference of the borehole wall. When the pulse impinges on the borehole surface, the energy corresponding to the resultant scattered and specularly reflected wavefield is separately detected by each transducer in the array. Means are provided for measuring the extent of variation or decay in reflection amplitude from a maximum across the array for each position of the rotating transducer array. This variation corresponds to the amplitude variation away from a specular reflection path. A numerical value may be assigned to define the sharpness or flatness of the curve of such variation. This in turn enables the generation of a greyscale or color value image of surface roughness which can be displayed for the entire circumference of the borehole surface at any given depth.

The foregoing means and method can be supplemented by recording the travel times of the ultrasonic televiewer pulses at a given point on the borehole surface and at adjacent points as the tool is rotated. By a linear least squares method, a plot of the distances between the tool and the borehole surface corresponding to such adjacent point travel times can be used to generate the path of a tangent to the borehole wall at the given point. This path may be geometrically related to the path of the ultrasonic beam impinging upon the borehole surface at such point to define the angle of incidence of the beam. The variation in this incident angle with reflection amplitude as the receiver array is rotated constitutes an index of surface texture or roughness.

DESCRIPTION OF THE PREFERRED EMBODIMENTS

Figure 1:
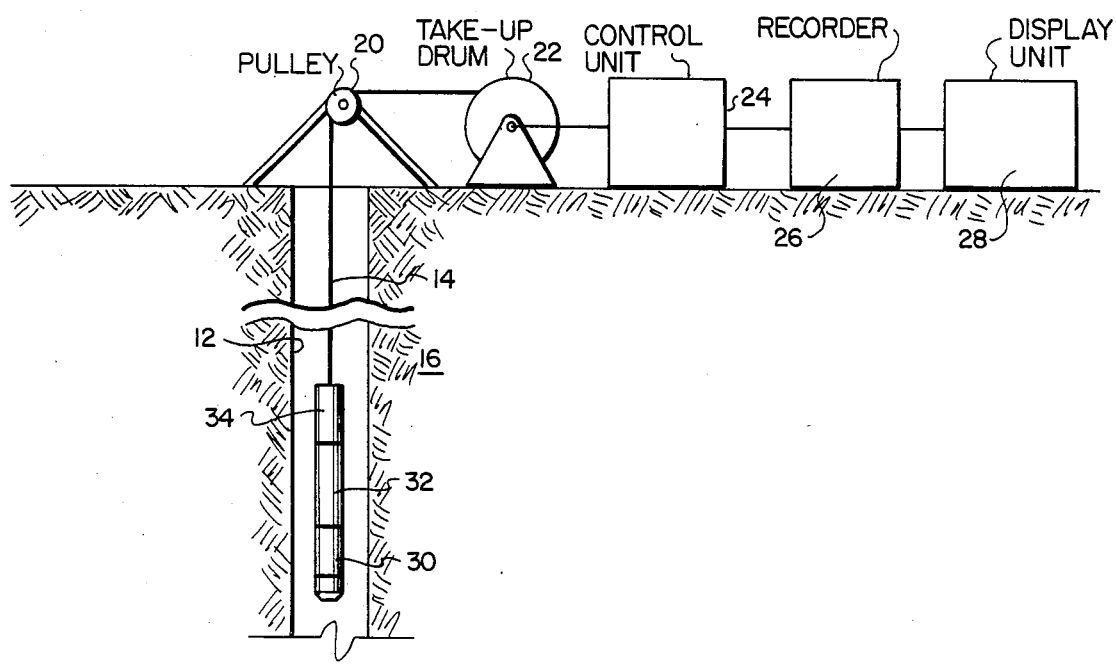
FIG. 1 is a diagrammatic view of a downhole tool in accordance with the preferred embodiment of this invention showing connections to surface equipment.

Referring now to FIG. 1, a downhole tool or sonde 10 is shown lowered within borehole 12 by means of cable or wire line 14 which is supported by pulley 20 as it pays out from take-up drum 22. Associated surface equipment (to be discussed below), which is usually carried in a field truck (not shown) consists of electrical control unit 24, recorder 26 and display unit 28. These surface components are either of well-known commercial design or can be readily designed without the exercise of invention by those skilled in the electronics and computer arts.

Sonde 10 is a modified borehole televiewer comprising a special multi-receiver transducer section 30 (to be described in more detail in connection with FIG. 2), an electrical section 32 containing a motor drive and electrical pulse generator means (not shown) and an orientation section 34.

Figure 2:
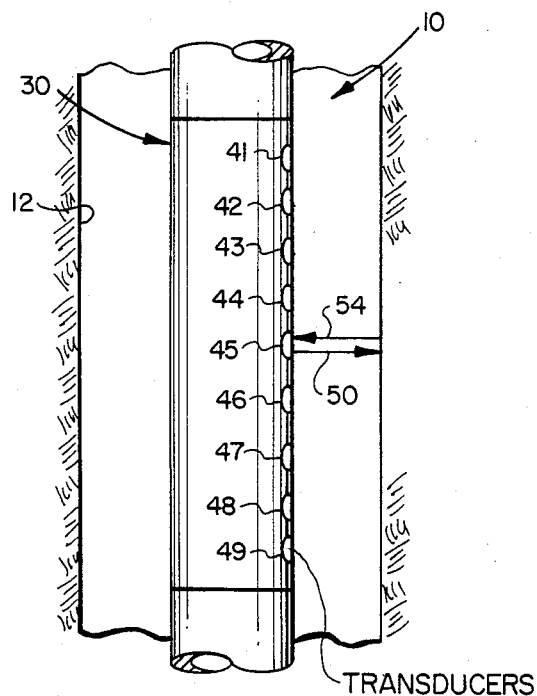
FIG. 2 is a detail of the transducer section of the downhole tool of FIG. 1, illustrating diagrammatically a vertically extending transducer array carried therein.

Referring now to FIG. 2, a conventional transmit/receive transducer 45 is positioned approximately midway between the upper and lower ends of transducer section 30. A plurality of additional receiver transducers, for example, transducers 41, 42, 43, 44, 46, 47, 48, and 49 are disposed vertically above and below transducer 45. This transducer array is rotatable as a unit by means of the motor drive in section 32. In operation, power is transmitted through surface control unit 24 to electrical section 32 and the transducer array 41-49 is rotated within borehole 12 so as to deliver a series of ultrasonic pulses laterally toward the surface of borehole 12. Typically, a device such as sonde 10 will produce and deliver about 500 pulses per revolution at a rotational speed of 3 revolutions per second.

Figure 3:
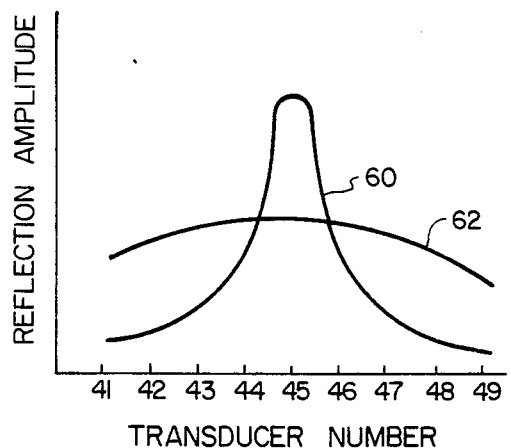
FIG. 3 is a diagram illustrating specular reflection responsive to different arbitrary angles of incidence of ultrasonic energy on a borehole wall and the associated scattered energy reflections.

For each firing of transducer 45, energy corresponding to the resultant specular reflected and scattered wavefield is detected by the receiving array 41-49 and recorded by surface unit 26. The variation in amplitude across array 41-49 corresponds to the reflection amplitude away from the specular path 54 and thus provides an indication of surface roughness. FIG. 3 illustrates two examples of variation in reflection amplitude across array 41-49 at a given point on the surface of borehole 12. In the peaked or bell-shaped curve 60 reflection amplitude is a maximum at or in the vicinity of transducer 45 and decays rapidly in both directions across array 41-49. Curve 60 may be interpreted to mean that almost all of the incident ultrasonic energy is being specularly reflected back at or close to any angle of 90° and that very little scattered energy is present. By contrast, curve 62 indicates that reflection amplitude, while reduced in magnitude is relatively constant for all transducers across array 41-49, indicating the presence of a much larger percentage of scattered energy 56 and hence a much rougher textured borehole surface.

In practice it is convenient to assign a numerical value to the shape of the curves of FIG. 3 generated in the manner described above as an indicator of their relative flatness or peaked characteristic. This can be done, for example, by taking the maximum reflection amplitude value perceived by any of the transducers of array 41-49 and dividing it by the average of the individual detected values. These numerical values can then be converted to grey-scale or color values and displayed by surface display unit 28 as an image (not shown) of the complete circumference of the borehole 12 in terms of surface texture or roughness. With the aid of an orientation means in section 34, such as a magnetometer, this image can be azimuthally registered with a reference geographical direction, thus adding to the explorationist's understanding of the structure of formation 16.

Figure 4:
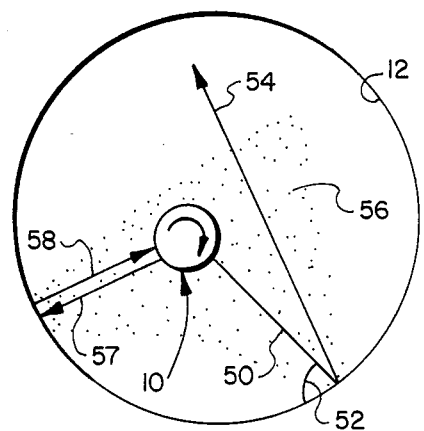
FIG. 4 is a graph of the variation in reflection amplitude across the transducer array of FIG. 2 at a given point on the surface of the borehole responsive to a single ultrasonic pulse.

An alternate mode of operation of this invention involves variations in the incident angle of the ultrasonic pulse. As best seen in FIG. 4, an ultrasonic pulse transmitted from transducer 45 along a path 50 may strike the wall of borehole 12 at some angle of incidence 52, producing specular reflections such as along path 54 and scattered energy represented by reference numeral 56. If the pulse from sonde 10 were to strike borehole wall 12 at 90° (i.e. a normal), such as along incident and reflection paths 57 and 58, the total specular reflection would be detected by transducer 45. However, with variations in borehole shape and position of sonde 10 within borehole 12, the incident angle 52 will vary from normal incidence, and some portion of the specular reflection will not be detected by transducer 45.

Figure 5:
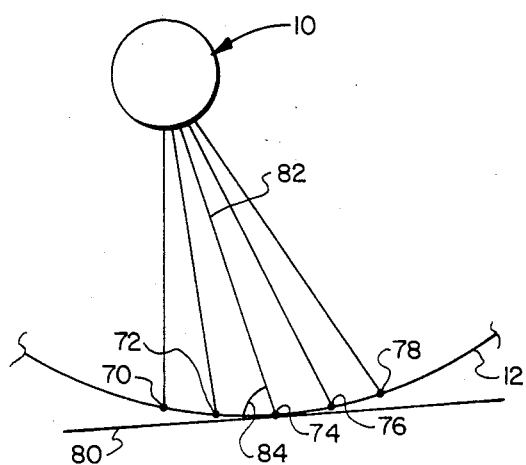
FIG. 5 is a graph of accummulated reflection amplitude vs. incident angle data for one or more revolutions of the transducer array of FIG. 2.
Figure 6:
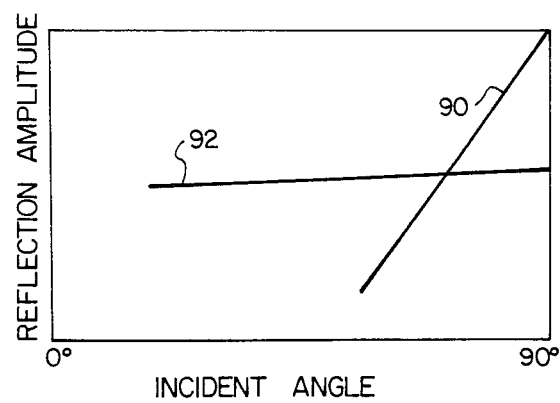
FIG. 6 is a detail diagram of the incident acoustic pulse paths used in calculations according to an alternate embodiment of this invention.

The alternate mode of operation comprises measuring the travel time and reflection amplitude of ultrasonic pulses between sonde 10 and borehole wall 12 for each firing of the transmitter. The travel time information defines the general cross-sectional contour of the wall of the borehole. As best seen in FIG. 5, travel times to and from several closely adjacent points such as points 70, 72, 74, 76 and 78 on the surface of wall 12 converted to distances can be made to define the path of a tangent line 80 to the wall of borehole 12 at median point 74, such as by a linear least square fit method. The incident angle 84 between such tangent line 80 and the path 82 of incident energy to point 74 can then be determined. This incident angle 84 varies from normal incidence (90°) due at least in part to borehole shape or sonde offset from borehole center. Reflection amplitude vs. incident angle 84 can in this way be accummulated for one or more revolutions of transducer 45 and plotted as shown in FIG. 6. As an example, steeply sloped curve 90 is indicative of a borehole surface in which reflection amplitude falls off very rapidly with decrease in incident angle. Conversely, curve 92 indicates a borehole surface wherein reflection amplitude is relatively independent of incident angle. Curve 90 is therefore interpreted as representing a relatively smooth borehole surface while curve 92 implies a relatively rough textured surface involving a high percentage of scattered energy. It is apparent that the conclusions reached from analyzing results such as shown in FIG. 6 should confirm the results reached from the analysis of FIG. 3.

The proposed system and method enables a measurement of borehole surface texture on a fine scale compared to the resolution of conventional logging techniques. The surface texture of rocks is often related to variation in geologic and lithology properties. Furthermore, the system and method can be used to study the surface texture of the steel surface of a lined borehole thus conveying information concerning the condition of the liner surface.

What has been described and shown is illustrative only and modifications and types and arrangement of components will occur to those skilled in this art within the scope of this invention as more particularly set forth in the appended claims.

What is claimed is:

1. In a well logging system utilizing a borehole tool of the type that acoustically scans the wall of a borehole by rotating an acoustical transducer adapted to transmit acoustic energy in the form of pulses in the direction of said wall and to receive at least a portion of the resultant energy reflected therefrom, the improvement comprising:
    (a) a plurality of receiving transducers disposed vertically above and below said combined transmission and receiving transducer to form therewith a transducer array;
    (b) means for recording the reflected energy detected by each transducer of said array;
    (c) means for determining the variation in amplitude of said reflected energy across said array at each point on said surface to which said acoustic pulses are directed as an indicator of roughness of surface of said borehole wall.

2. A system as in claim 1 including means for calculating a numerical value indicative of the maximum variation of said reflection amplitude.

3. The system as in claim 2 including means for assigning color values corresponding to each of said numerical values and means for preparing from said color values a strip image indicative of the varying roughness of said borehole wall about its circumference.

4. A system as in claim 3 including means for imposing a fiduciary mark on said image for azimuthal registration of the color values thereof.

5. In a well logging system utilizing a borehole tool of the type that acoustically scans the wall of a borehole by rotating acoustical transducer means adapted to transmit acoustic energy in the form of pulses in the direction of said wall and to receive at least a portion of the resultant energy reflected therefrom, the method comprising the steps of:

(a) detecting the travel time of said acoustic pulses between said transducer means and said wall as said transducer means are rotated;

(b) calculating from said travel time the cross-sectional contour of said wall;

(c) calculating the aproximate paths of a plurality of tangents to said cross-sectional contour at spaced apart points therealong;

(d) determining the angle of incidence at each said point between the corresponding tangent and the path of the acoustic pulse impinging on said wall at said point; and (e) calculating the variation in said incident angle with reflection amplitude as an index of surface roughness of said borehole.

* * * * *